United States Patent
Soma et al.

(10) Patent No.: US 8,573,782 B2
(45) Date of Patent: Nov. 5, 2013

(54) DISCHARGE LAMP DRIVE DEVICE, DISCHARGE LAMP DRIVE METHOD, LIGHT SOURCE DEVICE, AND PROJECTOR

(75) Inventors: Shigeyasu Soma, Muroran (JP); Tetsuo Terashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 593 days.

(21) Appl. No.: 12/721,743

(22) Filed: Mar. 11, 2010

(65) Prior Publication Data

US 2010/0238418 A1 Sep. 23, 2010

(30) Foreign Application Priority Data

Mar. 19, 2009 (JP) ................................. 2009-068612

(51) Int. Cl.
*G03B 21/20* (2006.01)
(52) U.S. Cl.
USPC ........................................... 353/85; 315/207
(58) Field of Classification Search
USPC .............. 315/207, 291; 353/85; 313/113–114
See application file for complete search history.

(56) References Cited

U.S. PATENT DOCUMENTS

| 7,049,768 | B1 * | 5/2006 | Zhu et al. | 315/307 |
| 7,928,669 | B2 * | 4/2011 | Li et al. | 315/308 |
| 2002/0097007 | A1 * | 7/2002 | Koncz et al. | 315/291 |
| 2005/0094110 | A1 * | 5/2005 | Nakamura | 353/85 |
| 2008/0088239 | A1 * | 4/2008 | Takezawa | 313/623 |
| 2009/0051300 | A1 * | 2/2009 | Deppe et al. | 315/307 |

FOREIGN PATENT DOCUMENTS

| JP | 2000-131668 A | 5/2000 |
| JP | 2006-236634 A | 9/2006 |
| JP | 2008-123874 | * 11/2006 |
| JP | 2008-123874 A | 5/2008 |

OTHER PUBLICATIONS

English translation of JP publication 2008-123874.*
English Translation of JP publication 2008-123874, Nov. 14, 2006.*

* cited by examiner

*Primary Examiner* — Francis M Legasse, Jr.
*Assistant Examiner* — Jerry Brooks
(74) *Attorney, Agent, or Firm* — ALG Intellectual Property, LLC

(57) ABSTRACT

A discharge lamp drive device for driving a discharge lamp including a first electrode and a second electrode, include: a power supply unit which supplies alternating power to the discharge lamp by inputting alternating current between the first electrode and the second electrode, wherein the power supply unit includes a power reduction control unit which reduces the alternating power from a first level to a second level lower than the first level, and a duty ratio control unit which steppedly varies duty ratio of the alternating current in a predetermined period at the time of reduction of the alternating power.

16 Claims, 15 Drawing Sheets

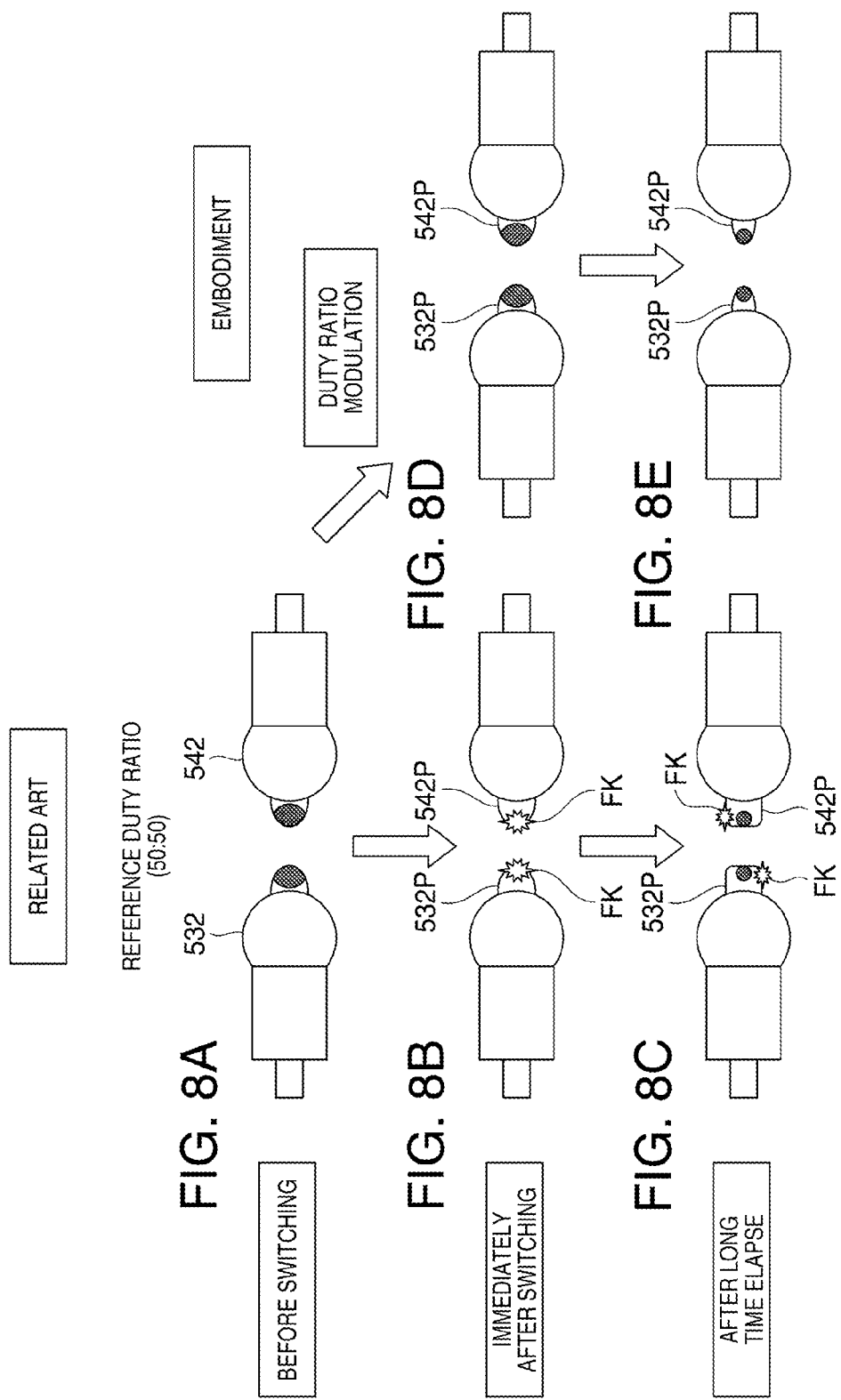

DISCHARGE LAMP DRIVE DEVICE, DISCHARGE LAMP DRIVE METHOD, LIGHT SOURCE DEVICE, AND PROJECTOR

BACKGROUND

1. Technical Field

The present invention relates to a technology of driving a discharge lamp which emits light by discharge generated between electrodes.

2. Related Art

A projector provided with a discharge lamp is known. This type of projector supplies alternating power to the discharge lamp to generate discharge between two electrodes provided on the discharge lamp. In addition, such a technology is known which switches alternating power supplied to the discharge lamp from rated power to low power so as to increase life and decrease power consumption of the discharge lamp (see JP-A-2000-131668). The discharge lamp emits light by generating arc between projections formed on the respective electrodes.

According to the related-art technology discussed above, however, the quantity of fusion at the tips of the electrodes decreases when the discharge lamp is driven by power lower than rated power. In this case, projections having preferable shape are not formed, and thus arc flicker (hereinafter abbreviated as "flicker") shifting the base point of arc may be produced. The flicker is more easily produced particularly immediately after power is switched to low power.

SUMMARY

It is an advantage of some aspects of the invention to provide a technology of reducing flicker generated when alternating power supplied to a discharge lamp is lowered, and the invention can be implemented as the following aspects or embodiments.

First Aspect

A first aspect of the invention is directed to a discharge lamp drive device for driving a discharge lamp including a first electrode and a second electrode, the discharge lamp drive device including: a power supply unit which supplies alternating power to the discharge lamp by inputting alternating current between the first electrode and the second electrode. The power supply unit includes a power reduction control unit which reduces the alternating power from a first level to a second level lower than the first level, and a duty ratio control unit which steppedly varies duty ratio of the alternating current in a predetermined period at the time of reduction of the alternating power.

According to the structure of the first aspect, the duty ratio of the alternating current steppedly changes in the predetermined period at the time of reduction of the alternating power. Thus, the time for operating the first electrode with the anode and the time for operating the second electrode with the anode can be switched and prolonged. Accordingly, a fusion quantity at the tips of the electrodes equivalent to the fusion quantity before reduction of the alternating power can be obtained, and generation of flicker immediately after the reduction can be prevented.

Second Aspect

A second aspect of the invention is directed to the discharge lamp drive device of the first aspect, the discharge lamp drive device further including: a switching command receiving unit which receives a switching command for switching from a rated power mode for driving the discharge lamp by rated power as the first level to a low power mode for driving the discharge lamp by low power as the second level from the outside of the discharge lamp drive device. The power reduction control unit executes the reduction when the switching command receiving unit receives the switching command. The duty ratio control unit determines the predetermined period as a period starting when the switching command receiving unit receives the switching command.

According to the structure of the second aspect, the duty ratio of the alternating current can be varied immediately after reception of the switching command from the rated power mode to the reduction mode. Thus, the fusion quantity at the tips of the electrodes discussed above can be obtained in the early stage of the switching. Thus, generation of flicker immediately after the reduction can be securely prevented.

Third Aspect

A third aspect of the invention is directed to the discharge lamp drive device of the first aspect, the discharge lamp drive device further including: a switching command receiving unit which receives a switching command for switching from a rated power mode for driving the discharge lamp by rated power as the first level to a low power mode for driving the discharge lamp by low power as the second level from the outside of the discharge lamp drive device. The power reduction control unit executes the reduction after elapse of a predetermined delay time from the time when the switching command receiving unit receives the switching command. The duty ratio control unit determines the predetermined period as a period starting when the switching command receiving unit receives the switching command.

With increase in lighting time, concaves and convexes are produced at the tips of the electrodes of the discharge lamp. The concaves and convexes produced at the tips of the electrodes generate flickers. When alternating power supplied to the discharge lamp is low, alternating current produced therefrom is low accordingly. In this case, only low fusing energy is generated, and the concaves and convexes produced at the tips of the electrodes are difficult to be fused. According to the structure of the third aspect, however, actual reduction of the alternating power supplied to the discharge lamp is delayed by the delay time. In this case, the duty ratio can be varied while rated power is being supplied to the discharge lamp. Thus, the concaves and convexes at the tips of the electrodes difficult to be fused after actual reduction of the alternating power can be fused, and generation of flicker can be further prevented.

Fourth Aspect

A fourth aspect of the invention is directed to the discharge lamp drive device of the second or third aspect, wherein the duty ratio control unit determines the end of the predetermined period as the time when the low power mode is finished.

According to the structure of the fourth aspect, a large fusion quantity can be obtained during the low power mode even after elapse of a long time from power reduction. Thus, generation of flicker can be securely prevented for a long time from power reduction.

Fifth Aspect

A fifth aspect of the invention is directed to the discharge lamp drive device of any of the first through third aspects, wherein the power reduction control unit gradually executes the reduction from the first level to the second level in a period equivalent to the predetermined period.

According to the structure of the fifth aspect, the duty ratio can be changed in the period synchronized with the period for switching the alternating power from the first level to the second level. Thus, generation of flicker at the time of power reduction can be securely prevented.

Sixth Aspect

A sixth aspect of the invention is directed to the discharge lamp drive device of the fifth aspect, wherein: the power reduction control unit steppedly varies the reduction from the first level to the second level; and the duty ratio control unit synchronizes the stepped change of the duty ratio with the stepped change of the alternating power by the power reduction control unit.

According to the structure of the sixth aspect, the alternating power is steppedly varied from the first level to the second level, and the duty ratio is steppedly varied in synchronization with the stepped change of the alternating power. In this case, the power reduction rate and the duty ratio change rate correspond to each other. Thus, control accuracy can be increased, and generation of flicker at the time of power reduction can be further securely prevented.

Seventh Aspect

A seventh aspect of the invention is directed to the discharge lamp drive device of any of the first through sixth aspects, wherein the duty ratio control unit varies the duty ratio by one cycle pattern or plural cycle patterns, and determines the one cycle pattern or the plural cycle patterns such that one cycle contains plural division terms and that duty ratio change between adjoining division terms becomes constant.

According to the structure of the seventh aspect, the duty ratio can be steppedly varied at constant speed.

Eighth Aspect

An eighth aspect of the invention is directed to the discharge lamp drive device of any of the first through seventh aspects, the discharge lamp drive device further including: a deterioration level detecting unit which detects deterioration level of the electrodes. The duty ratio control unit determines the duty ratio change between adjoining division terms based on the deterioration level detected by the deterioration level detecting unit.

According to the structure of the eighth aspect, the duty ratio change between adjoining division terms is determined according to the deterioration level of the electrodes. Thus, generation of flicker at the time of switching to the low power can be prevented for the period of the life of the discharge lamp by controlling the duty ratio change in such a manner as to increase as the deterioration level rises.

Ninth Aspect

A ninth aspect of the invention is directed to a light source device including: a discharge lamp; the discharge lamp drive device of any of the first through eighth aspects; a main reflection mirror disposed on the first electrode side of the discharge lamp to reflect light emitted from the discharge lamp in a predetermined direction; a sub reflection mirror disposed on the second electrode side of the discharge lamp to reflect light emitted from the discharge lamp toward the main reflection mirror.

Tenth Aspect

A tenth aspect of the invention is directed to a projector including: a discharge lamp; the discharge lamp drive device of any of the first through eighth aspects; a spatial light modulation unit which modulates light emitted from the discharge lamp into projection light for projecting an image; and a projection system which projects the projection light.

Eleventh Aspect

An eleventh aspect of the invention is directed to a discharge lamp drive method for driving a discharge lamp including a first electrode and a second electrode, the method including: supplying alternating power to the discharge lamp by inputting alternating current between the first electrode and the second electrode. Supplying the alternating power includes reducing the alternating power from a first level to a second level lower than the first level, and steppedly varying duty ratio of the alternating current in a predetermined period at the time of reduction of the alternating power.

According to the light source device, projector, and discharge lamp drive method having the above structures, generation of flicker at the time of reduction of alternating power supplied to the discharge lamp can be prevented similarly to the discharge lamp drive device according to the first aspect.

The invention can be implemented in various forms such as a control method of a light source device including a discharge lamp drive device and a light source lamp, a control method of a projector including the light source device, a computer program for providing functions of the methods or the devices, and a recording medium for recording the computer program.

BRIEF DESCRIPTION OF THE DRAWINGS

The invention will be described with reference to the accompanying drawings, wherein like numbers reference like elements.

FIG. 8 shows comparison between arc generation condition in the first embodiment and arc generation condition in related art.

DESCRIPTION OF EXEMPLARY EMBODIMENTS

Exemplary embodiments according to the invention are hereinafter described in the following order.

Figure 1:
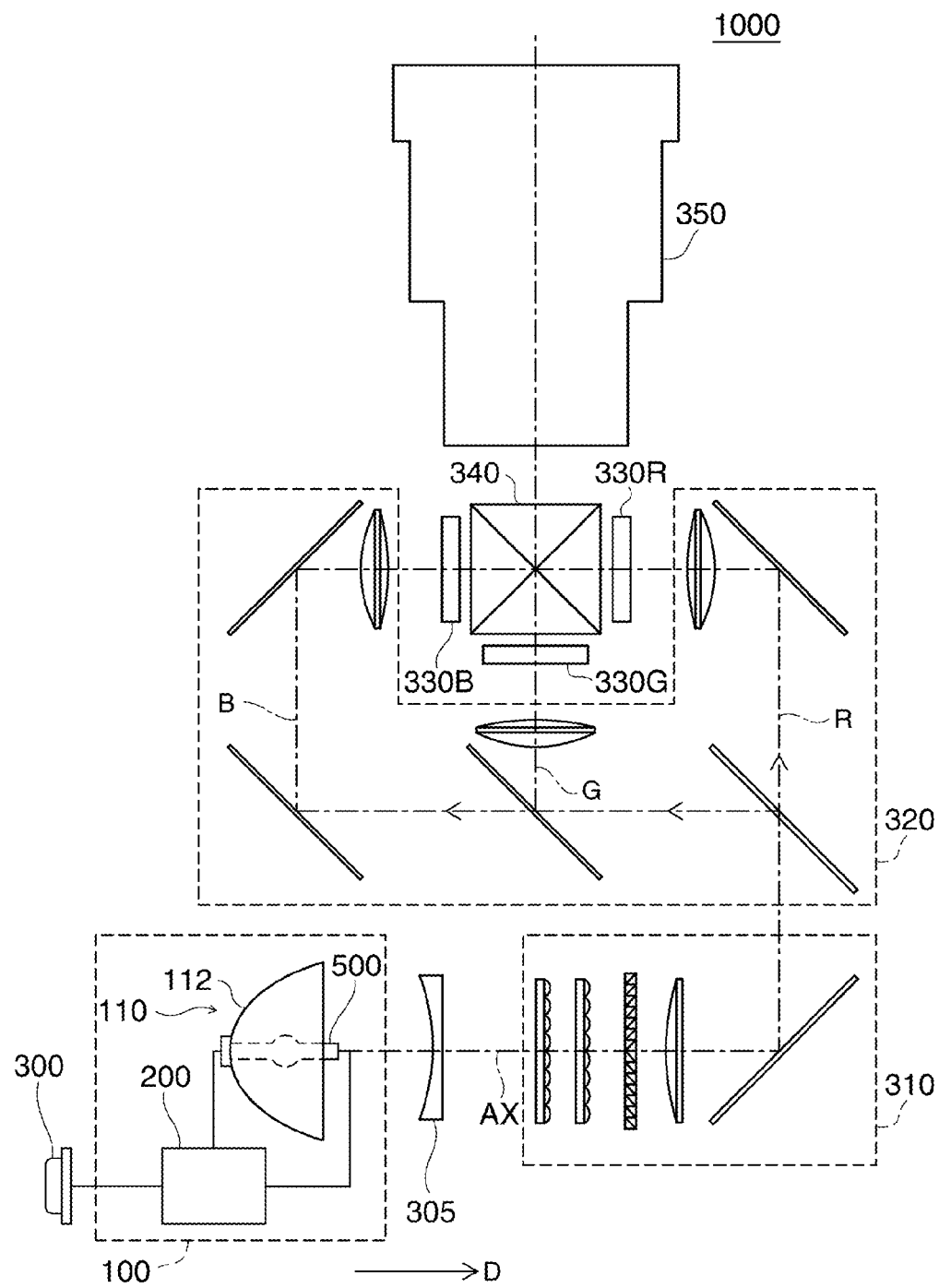
FIG. 1 illustrates a projector 1000 according to a first embodiment of the invention.

A. First Embodiment
A-1. General Structure
A-2. Structure of Power Supply Unit
A-3. Control Process
A-4. Operation and Advantage
A-5. Modified Examples of First Embodiment
B. Second Embodiment
C. Third Embodiment
D. Fourth Embodiment
E. Other Modified Examples A. First Embodiment A-1. General Structure FIG. 1 illustrates a projector 1000 according to a first embodiment of the invention. The projector 1000 includes a light source device 100, a collimating lens 305, an illumination system 310, a color division system 320, three liquid crystal light valves 330R, 330G, 330B, a cross dichroic prism 340, and a projection system 350.

The light source device 100 has a light source unit 110 and a power supply unit 200. The light source unit 110 has a main reflection mirror 112 and a discharge lamp 500. The power supply unit 200 supplies power to a discharge lamp 500 to turn on the discharge lamp 500. A main reflection mirror 112 reflects light emitted from the discharge lamp 500 in an illumination direction D. The illumination direction D is parallel with an optical axis AX. Light emitted from the light source unit 110 passes through the collimating lens 305 and enters the illumination system 310. The collimating lens 305 collimates light emitted from the light source unit 110.

The illumination system 310 equalizes illuminance of light emitted from the light source device 100. The illumination system 310 also equalizes the polarization direction of light from the light source device 100 into one direction. The illuminance and polarization direction of the light supplied from the light source device 100 are equalized so as to increase utilization efficiency of the light. The light having controlled illuminance distribution and polarization direction enters the color division system 320. The color division system 320 divides the entering light into three color lights in red (R), green (G), and blue (B). The three color lights are modulated by liquid crystal light valves 330R, 330G, and 330B in the corresponding colors. The modulated three color lights are combined by the cross dichroic prism 340. The combined light enters the projection system 350. The projection system 350 projects the entering light onto a not-shown screen such that an image can be displayed on the screen.

The respective structures of the collimating lens 305, the illumination system 310, the color division system 320, the cross dichroic prism 340, and the projection system 350 may be known structures of various types.

Figure 2:
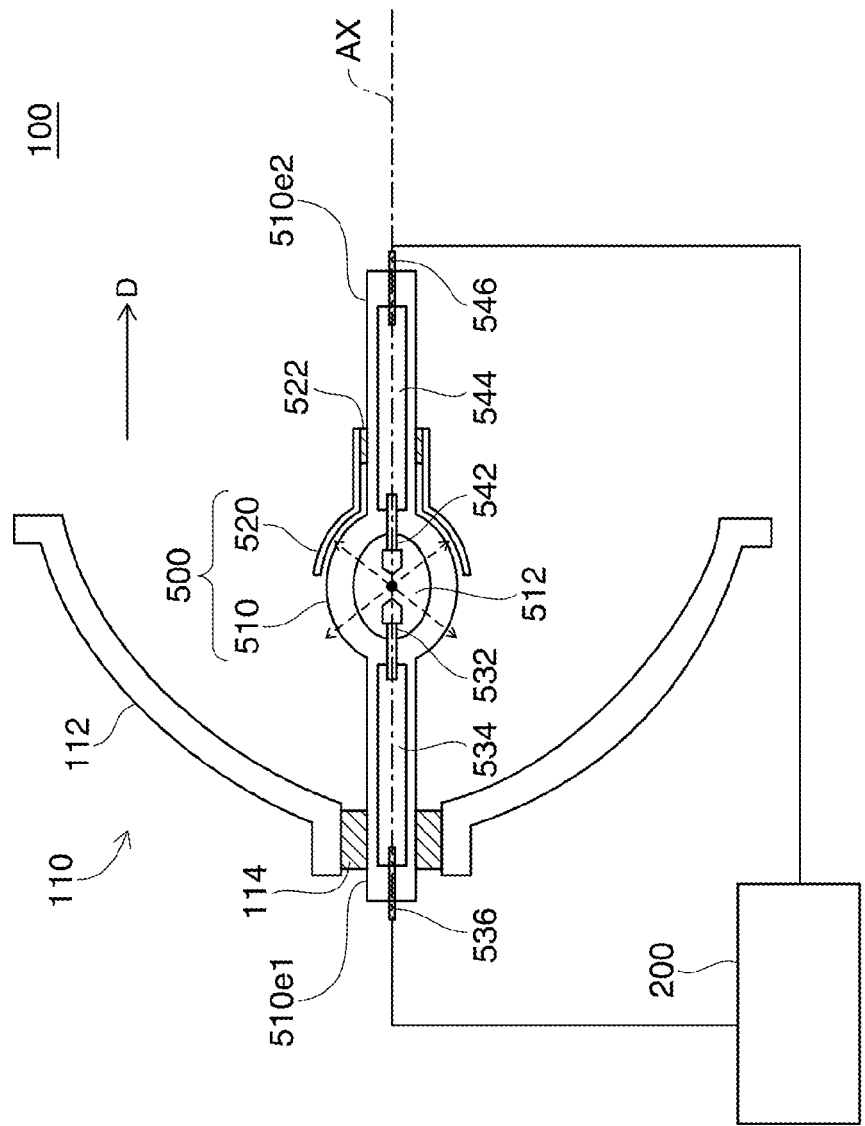
FIG. 2 illustrates a structure of a light source device 100.

FIG. 2 illustrates the structure of the light source device 100. As described above, the light source device 100 includes the light source unit 110 and the power supply unit 200. The figure shows the cross section of the light source unit 110. The discharge lamp 500 provided on the light source unit 110 has a discharge lamp main body 510 and a sub reflection mirror 520. The discharge lamp main body 510 corresponds to a "discharge lamp" in the appended claims.

The discharge main body 510 has bar shape extending from a first end 510e1 to a second end 510e2 in the illumination direction D. The discharge lamp main body 510 is made of light-transmissive material such as quartz glass. The central portion of the discharge lamp main body 510 is expanded in spherical shape, and a discharge space 512 is formed inside the central portion. Gas as discharge medium containing rare gas, metal halogen compound and the like is sealed into the discharge space 512.

Two electrodes 532 and 542 contained in the discharge space 512 project from the discharge main body 510. The first electrode 532 is disposed on the first end 510e1 side of the discharge space 512, and the second electrode 542 is disposed on the second end 510e2 side of the discharge space 512. The electrodes 532 and 542 have bar shape extending along the optical axis AX. The tips of the electrodes 532 and 542 (referred to as "discharge ends" as well) are opposed to each other predetermined distance apart in the discharge space 512. The electrodes 532 and 542 are made of metal such as tungsten.

A first terminal 536 is provided at the first end 510e1 of the discharge lamp main body 510. The first terminal 536 and the first electrode 532 are electrically connected by a conductive member 534 extending inside the discharge lamp main body 510. Similarly, a second terminal 546 is provided at the second end 510e2 of the discharge lamp main body 510. The second terminal 546 and the second electrode 542 are electrically connected by a conductive member 544 extending inside the discharge lamp main body 510. The respective terminals 536 and 546 are made of metal such as tungsten. The respective conductive members 534 and 544 are made of molybdenum foil, for example.

The terminals 536 and 546 are connected with the power supply unit 200. The power supply unit 200 supplies alternating current to the terminals 536 and 546. As a result, arc discharge is generated between the two electrodes 532 and 542. Light produced by the arc discharge (discharge light) is released in all directions from the discharge position as shown by arrows in broken lines.

A main reflection mirror 112 is fixed to the first end 5101e of the discharge lamp main body 510 by a fixing member 114. The reflection surface of the main reflection mirror 112 (surface on the discharge main body 510 side) has spheroidal shape. The main reflection mirror 112 reflects discharge light in the illumination direction D. The shape of the main reflection mirror 112 is not limited to spheroid, but may be various other shapes capable of reflecting discharge light in the illumination direction D. For example, the shape may be paraboloidal shape. In this case, the main reflection mirror 112 can convert discharge light into light substantially parallel with the optical axis AX. Thus, the collimating lens 305 (FIG. 1) can be eliminated.

The sub reflection mirror 520 is fixed to the second end 510e2 of the discharge main body 510 by a fixing member 522. The reflection surface of the sub reflection mirror 520 (surface on the discharge lamp main body 510 side) has spherical shape surrounding the second end 510e2 side of the discharge space 512. The sub reflection mirror 520 reflects discharge light toward the main reflection mirror 112. Thus, the sub reflection mirror 520 increases utilization efficiency of light released from the discharge space 512.

The fixing members 114 and 522 may be made of arbitrary heat resistance material (such as inorganic adhesive) capable of resisting heat generated from the discharge lamp main body 510. The method for determining the positions of the mirrors 112 and 520 with respect to the position of the discharge lamp main body 510 is not limited to the method for fixing the mirrors 112 and 520 to the discharge lamp main body 510, but may be other arbitrary methods. For example, the discharge lamp main body 510 and the main reflection mirror 112 may be separately fixed to a housing (not shown) of the projector. This applies to the sub reflection mirror 520.

A-2. Structure of Power Supply Unit

Figure 3:
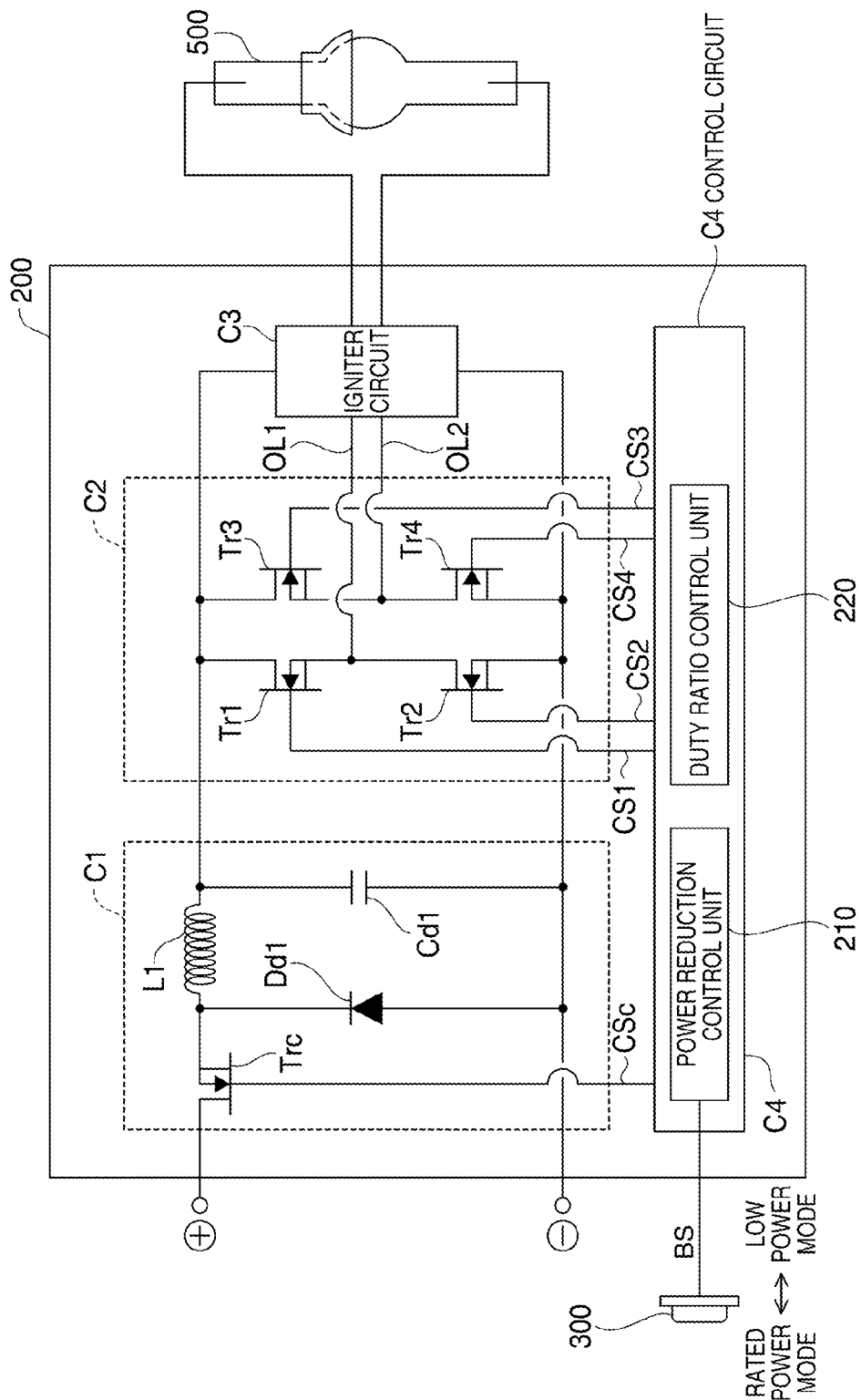
FIG. 3 illustrates a structure of a power supply unit 200.

FIG. 3 illustrates the structure of the power supply unit 200. The power supply unit 200 includes a down chopper circuit C1, an inverter bridge circuit C2, an igniter circuit C3, and a control circuit C4 for controlling the circuits C1 and C2.

The down chopper circuit C1 receives power supply from a not-shown direct current power source and controls output power. The down chopper C1 is constituted by a circuit of various known types. For example, a circuit having a combination of switch element (transistor) Trc, diode Dd1, coil L1, and capacitor Cd1 may be employed. The switch element Trc receives control signal CSc from the control circuit C4. The control signal CSc is a signal having H level and L level periodically repeated, for example.

The control circuit C4 controls output voltage by controlling the duty ratio of the control signal CSc. The control circuit C4 is constituted by a computer having CPU and memory. The control circuit C4 may be constructed by discrete logic circuit in plate of computer.

The inverter bridge circuit C2 receives power supply from the down chopper circuit C1, and controls waveform of output power. In this embodiment, the inverter bridge circuit C2 converts DC power into alternating power. The inverter bridge circuit C2 of this type is constituted by a circuit of various known types. In this embodiment, the inverter bridge circuit C2 is so-called H-type bridge circuit. The inverter bridge circuit C2 has four transistors Tr1 through Tr4. The two transistors Tr1 and Tr2 control a first output line OL1, and the other two transistors Tr1 and Tr4 control a second output line OL2. The transistors Tr1 through Tr4 receive control signals CS1 through CS4 from the control circuit C4, respectively. The control circuit C4 controls waveform of alternating current (drive signal) outputted from the output lines OL1 and OL2 by using the control signals CS1 through CS4. The control circuit C4 has functions as a power reduction control unit 210 and a duty ratio control unit 220. Voltage between the two electrodes 532 and 542 of the discharge lamp 500 is substantially constant voltage independent of current supplied to the discharge lamp 500. Thus, the power is reduced chiefly by changing current using the power reduction control unit 210. The details of the respective units 210 and 220 will be described later.

The igniter circuit C3 contains a not-shown booster circuit. The igniter circuit C3 applies high-voltage pulse between the electrodes 532 and 542 (see FIG. 2) at the time of start of lighting. As a result, insulation between the electrodes is broken to produce discharge path. In the subsequent steady-state lighting condition, the inverter bridge circuit C2 inputs alternating current (drive signal) to the discharge lamp 500 via the igniter circuit C3. The igniter circuit C3 is constituted by a circuit of various known types.

A-3. Control Process

The relationship between the polarity of power and the temperature of the electrodes, and alternating current as drive signal are initially explained, and then the control process is discussed.

Figures 4A, 4B:
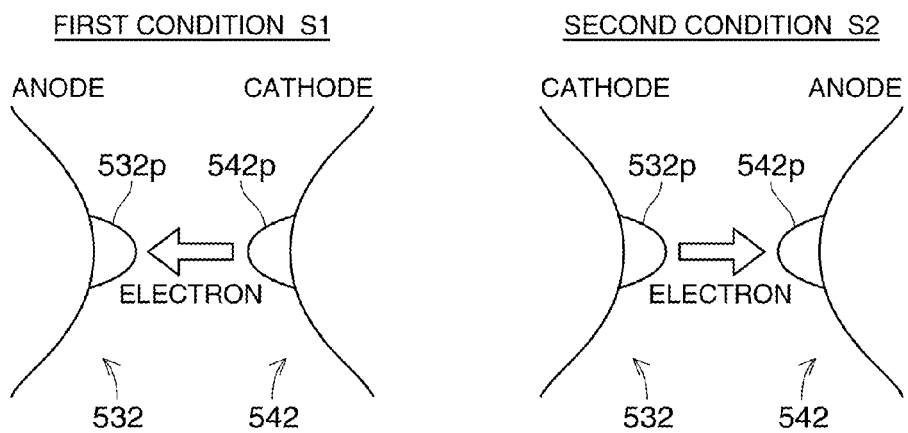
FIGS. 4A and 4B show operation conditions of two electrodes.

FIGS. 4A and 4B show operation conditions of the two electrodes 532 and 542. The figure shows the tips of the two electrodes 532 and 542. Projections 532$p$ and 542$p$ are formed at the tips of the electrodes 532 and 542, respectively. Discharge is generated between the projections 532$p$ and 542$p$. In this embodiment, shift of the discharge position (arc position) between the electrodes 532 and 542 can be reduced more than the structure having no projections. However, these projections 532$p$ and 542$p$ can be eliminated.

FIG. 4A shows a first condition S1. In the first condition S1, the first electrode 532 operates as anode, and the second electrode 542 operates as cathode. In the first condition S1, electrons move from the second electrode 542 (cathode) to the first electrode 532 (anode) by discharge. The cathode (second electrode 542) emits electrons. The electrons emitted from the cathode (second electrode 542) collide with the tip of the anode (first electrode 532). Heat is generated by this collision, and the temperature at the tip (projection 532$p$) of the anode (first electrode 532) rises.

FIG. 4B shows a second condition S2. In the second condition S2, the first electrode 532 operates as cathode, and the second electrode 542 operates as anode. In the second condition S2, electrodes move from the first electrode 532 to the second electrode 542 in contrast with the first condition S1. As a result, the temperature at the tip (projection 542$p$) of the second electrode 542 rises.

Thus, the temperature of the anode rises more easily than the temperature of the cathode. When the condition in which one of the electrodes has higher temperature than that of the other electrode continues, various problems may be caused. For example, when the tip of the high-temperature electrode is excessively fused, unexpected electrode deformation may be produced. In this case, the arc length may be deviated from the appropriate length. When fusion at the top of the low-temperature electrode is insufficient, small concaves and convexes produced at the top may be left without fusion. As a result, so-called arc jump (shift of unstable arc position) may be caused.

Figure 5:
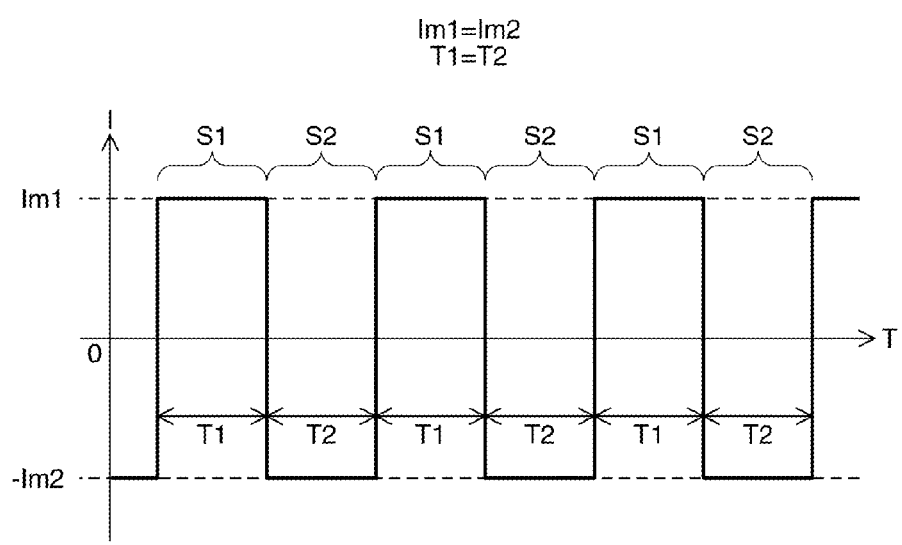
FIG. 5 illustrates drive signal (alternating current) inputted to a discharge lamp.

As a technique for preventing these problems, alternating drive for repeatedly switching polarities of the respective electrodes can be used. FIG. 5 shows drive signal (alternating current) inputted to the discharge lamp 500 (FIG. 2). The drive current shown in the figure is current during the steady-state operation of the discharge lamp 500. The horizontal axis indicates time T, and the vertical axis indicates current I. The current I is current flowing in the discharge lamp 500. Positive values show the first condition S1, and negative values show the second condition S2. In the example shown in FIG. 5, rectangular wave alternating current is used. The first condition S1 and the second condition S2 are alternately repeated. A first time T1 represents a period of continuation of the first condition S1, and a second time T2 represents a period of continuation of the second condition S2. A first current Im1 shows the current I (absolute value) in the first condition S1, and a second current Im2 shows the current I (absolute value) in the second condition S2.

The waveform of the current I contains symmetric positive values and negative values with their phases shifted from each other. That is, the waveform of the current I satisfies conditions Im1=Im2 and T1=T2. As a result, the conditions of power to be supplied to the two electrodes 532 and 542 become equal. The drive frequency can be determined from experimentation according to the characteristics of the discharge lamp 500 (discharge lamp main body 510) (for example, frequency in the range from 30 Hz to 1 kHz is used). Other values of Im1 (=1 m2) and T1 (=T2) can be similarly determined from experimentation.

Since T1=T2, the drive signal shown in FIG. 5 has duty ratio of 50:50. The "duty ratio" herein is indicated by a ratio of the first time T1 and the second time T2 to one cycle period (T1+T2), and expressed as T1:T2. The duty ratio of 50:50 is hereinafter referred to as "reference duty ratio". The drive signal shown in FIG. 5 is a signal during normal operation, and duty ratio such as "60:40" and "40:60" other than the reference duty ratio may be produced depending on the operation condition.

The projector 1000 can switch between rated power mode for driving the discharge lamp 500 by rated power (such as 200 W) and low power mode (eco mode) for driving the discharge lamp 500 by power lower than rated power (such as 170 W). The operator can change to the lower power mode by pressing a push button switch 300 (see FIGS. 1 and 3), and further change to the rated power mode by again pressing the push button switch 300.

The power reduction control unit 210 changes alternating current inputted to the discharge lamp 500 to switch alternating power from rated power to low power by controlling the control signal CSc when receiving a command corresponding to the press of the push button switch 300, that is, a switching command BS for switching from the rated power mode to the low power mode. The duty ratio control unit 220 steppedly changes the duty ratio of the alternating current (drive signal) from the reference duty ratio in a predetermined period at the time of switching from rated power to low power. The change pattern may be various types of pattern as will be described later.

Figure 6:
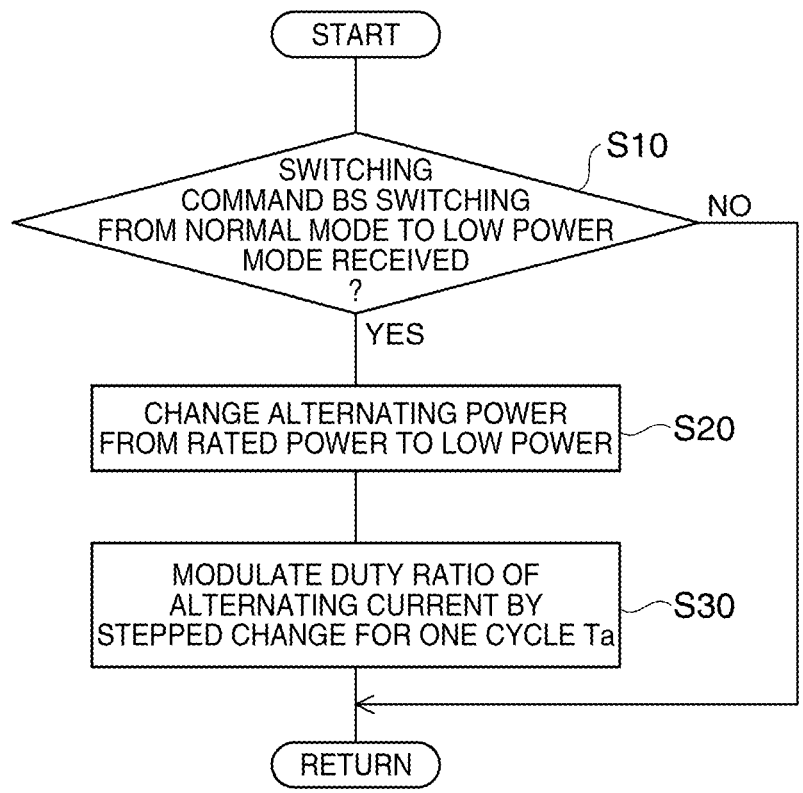
FIG. 6 is a flowchart showing a switching time control routine performed by a control circuit C4 included in the power supply unit.

FIG. 6 is a flowchart showing switching time control routine performed by the control circuit C4 included in the power supply unit 200. This switching time control routine is repeatedly carried out after the power of the control circuit C4 is turned on. As shown in the figure, the CPU of the control circuit C4 determines whether the switching command BS for switching from the rated power mode to the low power mode has been received from the push button switch 300 at the start of the process (step S10). When it is determined that the switching command BS has been received, the CPU switches the alternating power to be supplied to the discharge lamp 500 from rated power to low power (step S20). Simultaneously, the CPU steppedly changes the duty ratio of the alternating current to be inputted to the discharge lamp 500 to modulate the alternating current (step S30). The processes in step S20 and S30 are performed substantially at the same time.

Figure 7A:
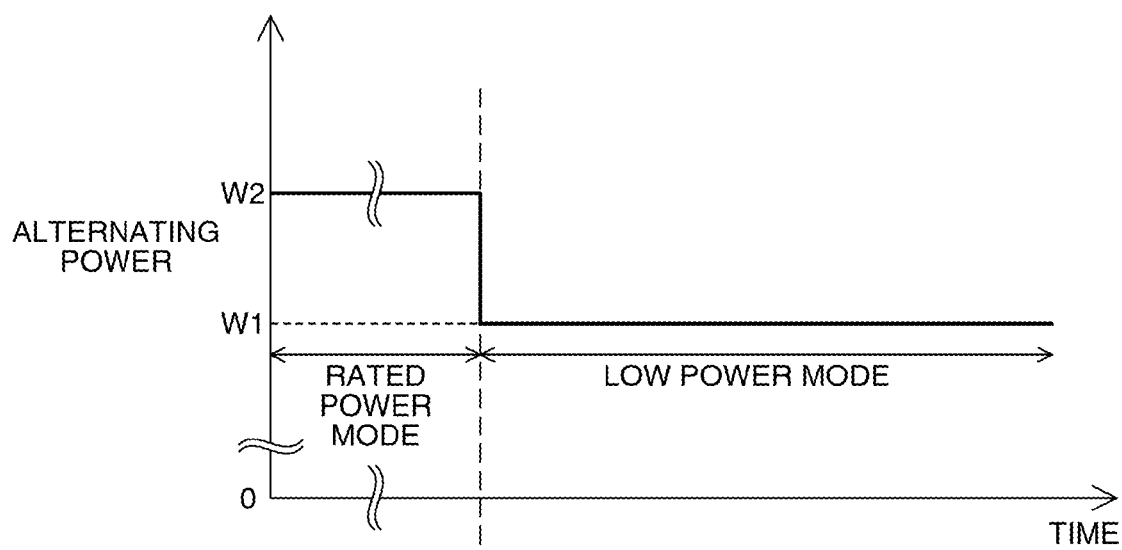
FIGS. 7A and 7B illustrate modulation of alternating current outputted to the discharge lamp containing timing charts.
Figure 7B:
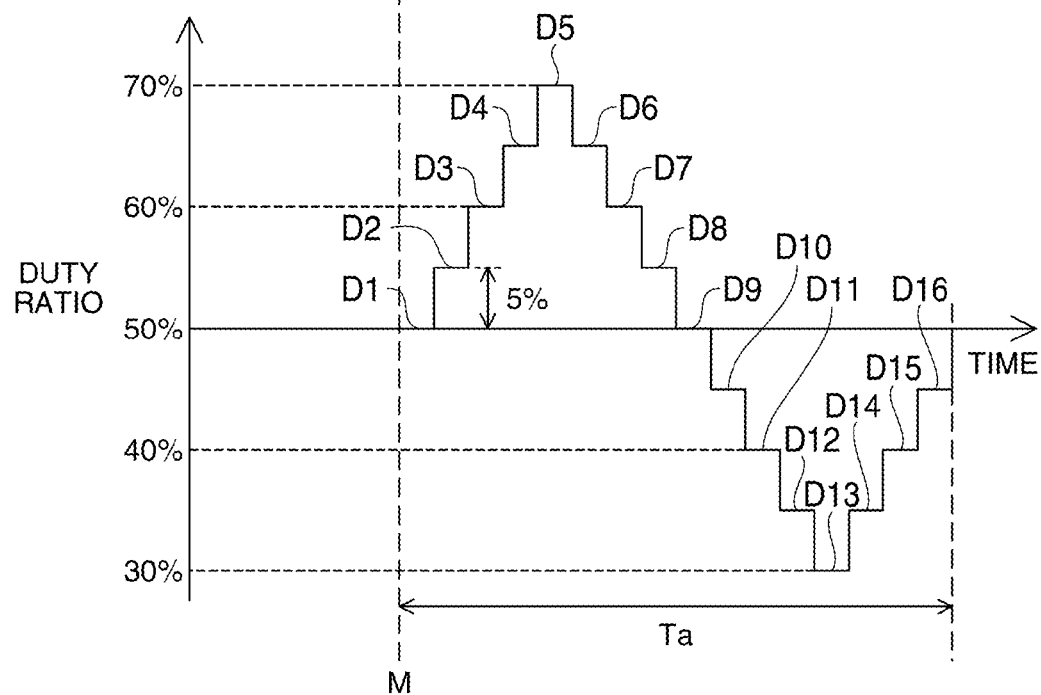

FIGS. 7A and 7B show modulation of the alternating current to be outputted to the discharge lamp 500 containing timing charts. FIG. 7A is a timing chart showing alternating power obtained from alternating current, and FIG. 7B is a timing chart showing modulation. As illustrated in FIG. 7A, the alternating power is switched from rated power W2 (such as 200 W) to low power W1 (such as 170 W) at the time when the switching command BS for switching from the rated power mode to the low power mode (time M) is received in response to press of the push button switch 300 under the driving condition in the rated power mode (200 W). This switching of the alternating power is achieved in step S20 by the function of the power reduction control unit 210 shown in FIG. 1.

As shown in FIG. 7B, the duty ratio of the alternating current inputted to the discharge lamp 500 is 50:50 in the rated power mode (i.e., period until time M). The duty ratio on the vertical axis in FIG. 7B is expressed by the proportion of the first condition S1 in which the first electrode 532 and the second electrode 542 operate as anode and cathode, respectively. That is, in case of FIG. 5, the proportion of the first time T1 to the one cycle period (T1+T2). The duty ratio hereinafter expressed only by percentage refers to the proportion of the first condition S1.

After the time M at which the switching command BS for switching from the rated power mode to the low power mode is received, the duty ratio of the alternating current steppedly increases from 50% to 70%. Then, the duty ratio steppedly decreases through 50% to 30%, and further steppedly increases to 50%. The period for returning to 50% is referred to as cycle Ta.

Thus, the duty ratio of the alternating current contains 16 division terms (division terms D1 through D16) each of which maintains the same value in one cycle Ta, and the duty ratio control unit 220 of the control circuit C4 performs control process for steppedly varying the duty ratio. The division term is a term in which the same alternating conversion control process is continued, and is set at 1 second in this embodiment. The duty ratio is 50% in the division term D1, and thereafter increases 5% for each step to reach the maximum duty ratio of 70% in the division term D5. Then, the duty ratio decreases 5% for each step to reach the minimum duty ratio of 30% in the division term D13. Subsequently, the duty ratio again increases 5% for each step to return to 50%. In this embodiment, switching of the duty ratio is performed for one cycle Ta. The change pattern in one cycle Ta corresponds to a "cycle pattern" in the appended claims.

Switching of the duty ratio of the alternating current in step S30 is achieved by the function of the duty ratio control unit 220 shown in FIG. 1.

According to this embodiment, the difference between the maximum (70%) of the alternating current and the reference duty ratio (50%) is set at 20%, and the difference between the reference duty ratio (50%) and the minimum (30%) is set at 20%. The differences are not limited to 20% but may be other values. The differences between the maximum and the reference and between the reference and the minimum are not required to be the same but may be different values. The change for each step is not limited to 5% but may be other value. The number of the division terms in one cycle Ta is not limited to 16 but may be other numbers. In this embodiment, the duty ratio is 50% in the division term D1. However, the duty ratio may be 55% in the division term D1, and may be varied 5% for each step in the following terms to reach 50% in the final division term (that is, the division term of 50% is shifted from the initial term to the final term).

Returning to FIG. 6, after execution of step S30, the flow goes to "return" to temporarily end the duty ratio control routine. When it is determined that the switching command BS for switching from the rated power mode to the low power mode is not received, the flow goes to "return" to temporarily end the duty ratio control routine.

A-4. Operation and Advantage

FIG. 8 shows comparison between arc generation condition in this embodiment and that in related art. As illustrated in part (A) in FIG. 8, the respective electrodes 532 and 542 repeat fusion and solidification with sufficient fusion quantity by alternating rated power before switching the drive of the discharge lamp 500 from the rated power mode to the low power mode. In the figure, the fused area is expressed as hatched area, and wide areas of the tips of the electrodes 532 and 542 are fused. The duty ratio of the alternating current in this step is 50:50.

Initially, the arc generation condition in the related art is discussed. As illustrated in the left part in the figure, the alternating current flowing in the electrodes 532 and 542 immediately decreases by power reduction immediately after switching from the rated power mode to the low power mode. Thus, the projections 532p and 542p (the same reference numbers as those in this embodiment are given to the electrodes and projections in the related art) are not sufficiently fused as shown in part (B) in FIG. 8. In this case, the tips of the projections 532p and 542p do not become spherical as in the rated power mode but become flat. When the tips of the projections 532p and 542p are flat, arc is generated at random positions on the flat projections 532p and 542p. As a result, flickers FK are produced.

After elapse of long time (such as 1 hour) from the switching, the fusion quantity of the projections 532p and 542p is further decreased, and flatness of the tips of the projections 532p and 542p is further promoted. The tips of the projections 532*p* and 542*p* become flat as shown in part (C) in FIG. 8. As a result, arc is generated at a number of positions on the projections 532*p* and 542*p*, and more flickers FK are produced.

On the other hand, the duty ratio of the alternating current is steppedly changed immediately after switching to the low power mode in this embodiment as illustrated in part (D) in FIG. 8. Thus, the fusion quantity at the tips of the projections 532*p* and 542*p* can be maintained equivalent to that in the rated power mode by increasing the period for operating the first electrode 532 with anode and the period for operating the second electrode 542 with anode in one cycle shown in FIG. 5 (T1+T2: see FIG. 5). As a result, generation of flickers FK can be prevented.

According to this embodiment, low alternating current for obtaining low power is used in one cycle Ta while varying the duty ratio of the alternating current. Thus, the areas of temperature increase on the projections 532*p* and 542*p* are narrowed, and the projections 532*p* and 542*p* obtain long and narrow shape. In this case, the long and narrow projections 532*p* and 542*p* can be fused by low alternating current even after elapse of long time as illustrated in part (E) in FIG. 8, and thus stable arc is generated from the tips of the long and narrow projections 532*p* and 542*p*. As a result, generation of flickers FK can be prevented even after elapse of long time.

A-5. Modified Examples of First Embodiment

Modified examples of the first embodiment are hereinafter described.

Modified Example 1 of First Embodiment

Figure 9:
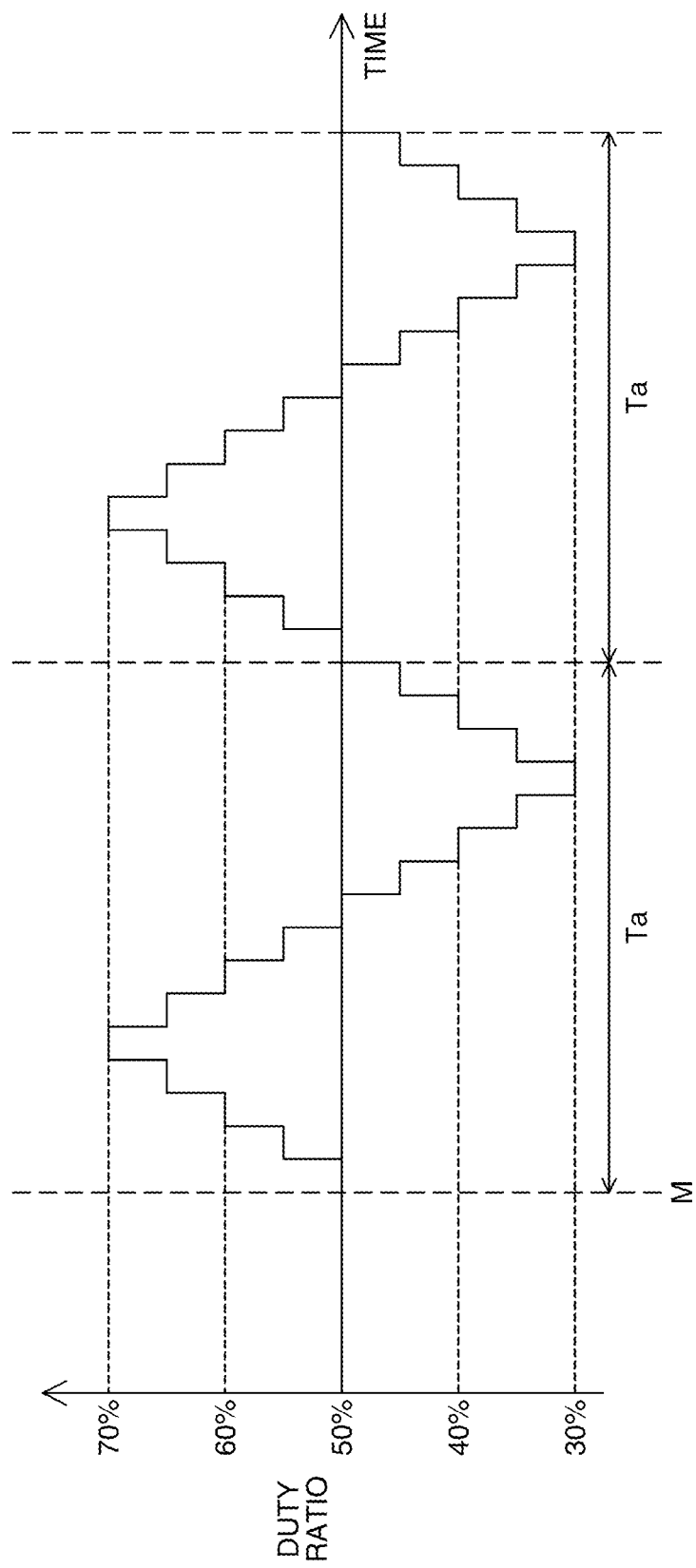
FIG. 9 is a timing chart showing modulation of duty ratio of alternating current according to a modified example 1 of the first embodiment.

FIG. 9 is a timing chart showing modulation of the duty ratio of the alternating current to be outputted to the discharge lamp according to a modified example 1 of the first embodiment. In the first embodiment, the period of modulation is the one cycle Ta constituted by 16 division terms. According to the modified example 1, however, the period of modulation contains two cycles Ta each of which has the same cycle pattern as that of the first embodiment. It is possible to determine the period of modulation as a period containing three, four or more plural cycles Ta.

The maximum period for modulation may be determined as period until the end of the low power mode. According to this structure, the fusion quantity in the low power mode can be maintained at a large quantity even after elapse of long time from power reduction. In this case, generation of flicker can be securely prevented for a longtime after power reduction.

Modified Example 2 of First Embodiment

According to the structure in the modified example 1 shown in FIG. 9, the change pattern of the duty ratio of the initial cycle Ta is the same as the change pattern of the duty ratio of the next cycle Ta. However, the change of the duty ratio for each step may be increased with elapse of time by using a change pattern of the later cycle Ta different from the change pattern of the earlier cycle Ta.

Figure 10:
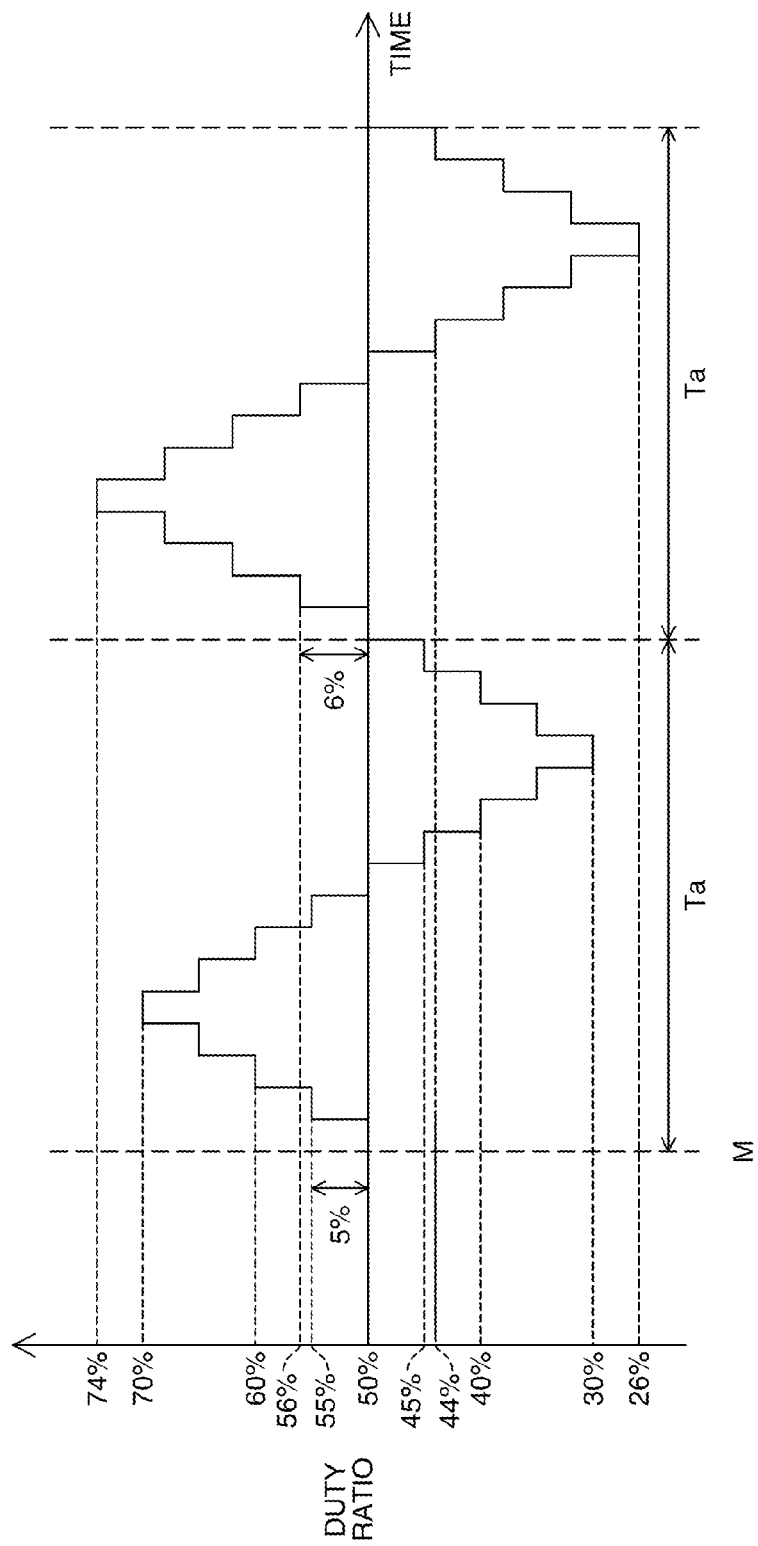
FIG. 10 is a timing chart showing modulation of duty ratio of alternating current according to a modified example 2 of the first embodiment.

FIG. 10 is a timing chart showing modulation of the duty ratio of the alternating current to be outputted to the discharge lamp in a modified example 2 of the first embodiment. As shown in the figure, the change for each step is 5% in the initial cycle Ta, but is increased to 6% in the next cycle Ta. This structure has two cycles Ta, but may contain three or more cycles Ta whose change for each step increases as in the later cycles Ta. In this structure, the change for changing the duty ratio for each step increases with elapse of time, and thus stable generation of arc and therefore more secure prevention of flicker can be achieved.

As can be seen from the first embodiment and the modified examples 1 and 2, any structures may be employed as long as they can switch the alternating power from the rated power mode to the low power mode when receiving the switching command BS for switching from the rated power mode to the lower power mode, and also steppedly change the duty ratio of the alternating current for one or plural cycles (one cycle for producing change into convex and concave shape) Ta starting from reception of the switching command BS. In these examples, the one cycle Ta produces change into convex and concave shape, but may produce change into concave and convex shape.

Modified Example 3 of First Embodiment

Figure 11:
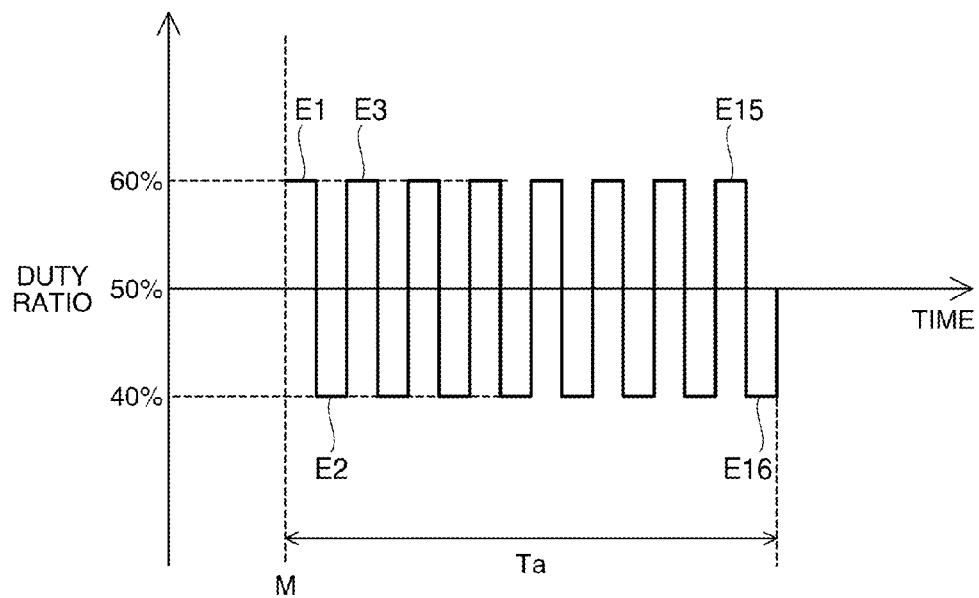
FIG. 11 is a timing chart showing modulation of duty ratio of alternating current according to a modified example 3 of the first embodiment.

FIG. 11 is a timing chart showing modulation of the duty ratio of the alternating current to be outputted to the discharge lamp in a modified example 3 of the first embodiment. According to the first embodiment and the modified examples 1 and 2, the duty ratio (in this specification, "duty ratio" refers to duty ratio of alternating current) is steppedly varied into convex and concave shape as a whole for one cycle. However, as shown in FIG. 11, the duty ratio in a division term E1 set at a first value (60% in the figure) larger than the reference duty ratio by a predetermined amount, and the duty ratio in a division term E2 following the division term E1 set at a second value (40% in the figure) smaller than the reference duty ratio by the predetermined amount are repeated in the 16 division terms E1, E2, E3, up to E15 and E16.

In this structure, the duty ratio is steppedly varied. Thus, generation of flicker can be prevented similarly to the first embodiment. In the modified example 3, the width and number of the division terms E1 through E16 are equal to those in the first embodiment such that the predetermined period for modulation becomes equal to the period for modulation in the first embodiment. However, the width of the division terms E1 through E16 and/or the number of the division terms E1 through E16 may be different from those in the first embodiment. In this case, the maximum period for modulation can be determined as period until the end of the low power mode similarly to the above examples.

Modified Example 4 of First Embodiment

According to the modified example 3, the duty ratio sequentially changes as larger duty ratio and smaller duty ratio than the reference duty ratio by the same change for each step. However, the change for each step may be varied.

Figure 12:
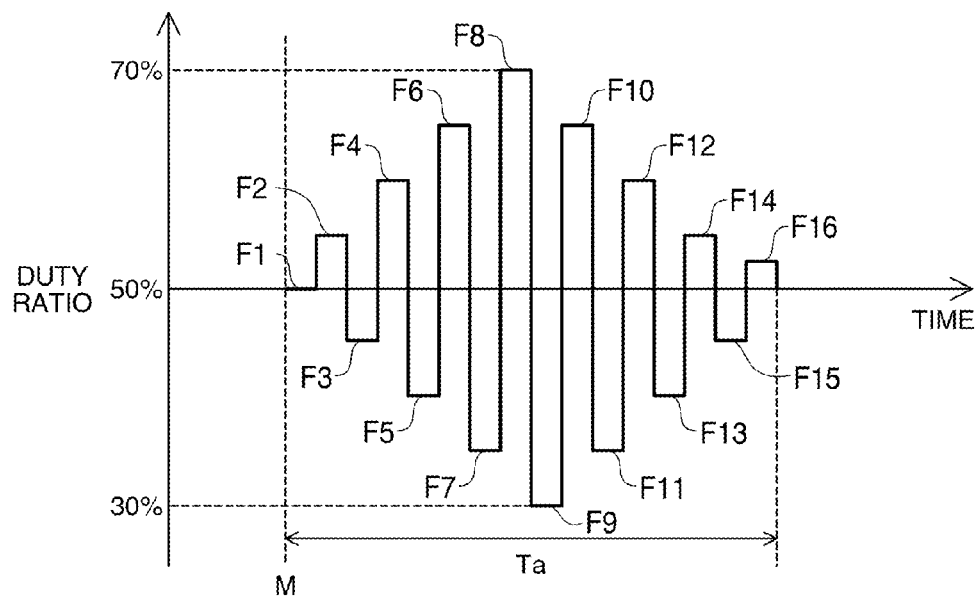
FIG. 12 is a timing chart showing modulation of duty ratio of alternating current according to a modified example 4 of the first embodiment.

FIG. 12 is a timing chart showing modulation of the duty ratio of the alternating current to be outputted to the discharge lamp in a modified example 4 in the first embodiment. As shown in the figure, the change of the duty ratio for each step gradually increases in division terms F1 through F8 in the front half of the cycle Ta, and gradually decreases in division terms F9 through F16 in the second half of the cycle Ta. In this structure, generation of flicker can be prevented similarly to the first embodiment.

As can be seen from the first embodiment and the modified examples 1 through 4, any structures may be employed as long as they can switch the alternating power from the rated power mode to the low power mode when receiving the switching command BS for switching from the rated power mode to the lower power mode, and also steppedly change the duty ratio of the alternating current for a predetermined period starting from reception of the switching command BS.

In the first embodiment and the modified examples 1 through 4, it is assumed that the occasion "when receiving the switching command BS" completely coincides with the time when receiving the switching command BS. However, this occasion is not required to completely agree with the time of reception of the switching command BS but may include control delay which may be ordinarily produced from reception of the switching command BS until the actual start of control.

In the first embodiment and the modified examples 1 through 4, the start point of the predetermined period for varying the duty ratio of the alternating current is set at the time of reception of the switching command BS for switching from the rated power mode to the low power mode. However, the start point of the predetermined period may be set after predetermined time delay from reception of the switching command BS.

B. Second Embodiment

A second embodiment according to the invention is hereinafter described. The second embodiment is different from the first embodiment only in the structure of the switching time control routine performed by the control circuit, and other parts are similar to those in the first embodiment.

Figure 13:
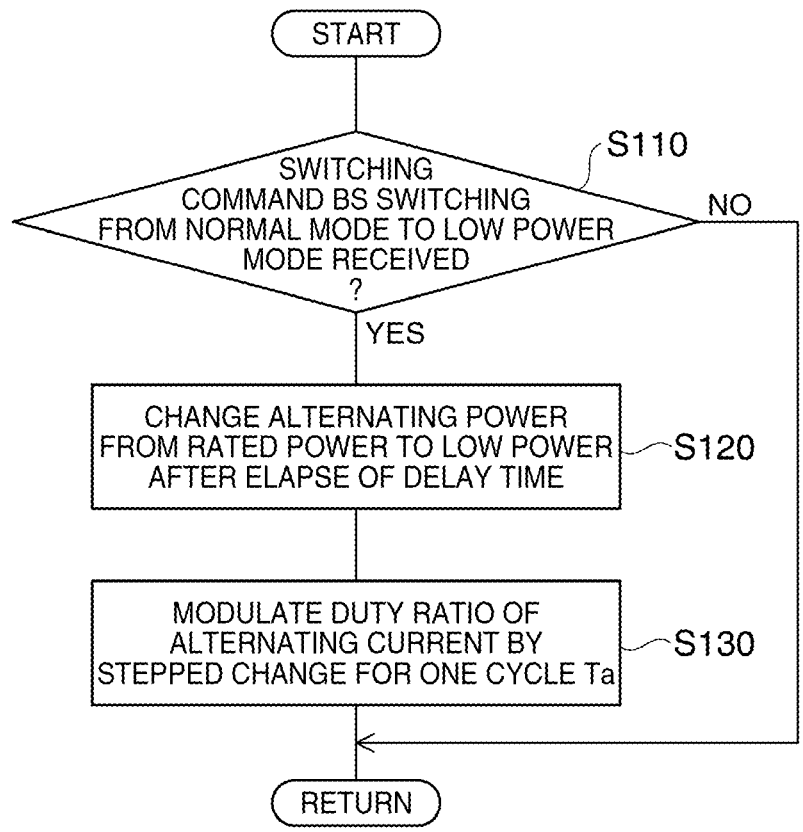
FIG. 13 is a flowchart showing a switching time control routine according to a second embodiment.

FIG. 13 is a flowchart showing a switching time control routine according to the second embodiment. This switching time control routine is different from the switching time control routine in the first embodiment (FIG. 6) only in the structure of step S120, and steps S110 and S130 are similar to steps S10 and S30 in the first embodiment. The CPU of the control circuit performs a process for changing alternating power from rated power to low power after elapse of a predetermined delay time (such as 16 seconds, i.e., one cycle of change pattern) in step S120. The delay time may be set at different time other than 1 minute.

Figure 14A:
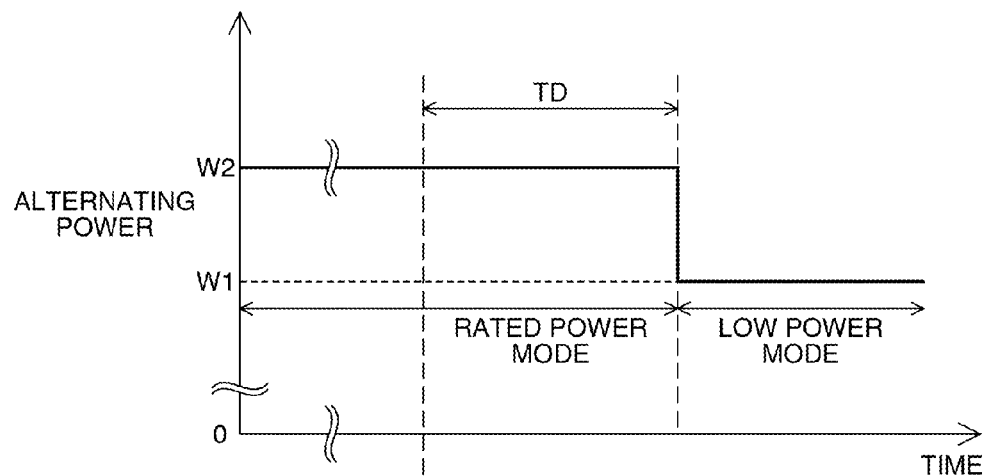
FIGS. 14A and 14B illustrate modulation of alternating current containing timing charts according to the second embodiment.
Figure 14B:
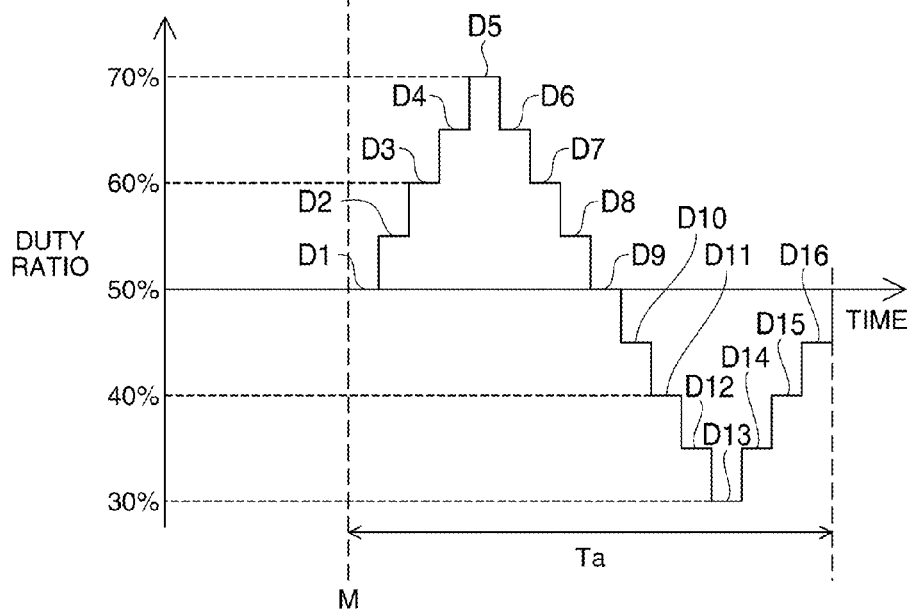

FIGS. 14A and 14B show modulation of alternating current containing timing charts according to the second embodiment. As illustrated in FIG. 14A, the alternating power is switched from the rated power W2 (such as 200 W) to the low power W1 (such as 170 W) after elapse of a predetermined delay time TD from the time of reception (time M) of a command for switching from the rated power mode to the low power mode in response to press of the push button switch 300.

As illustrated in FIG. 14B, the duty ratio of the alternating current to be inputted to the discharge lamp 500 is 50:50 in the rated power mode (i.e., until time M), and is modulated according to the same change pattern as that in the first embodiment at the time when receiving the command for switching from the rated power mode to the low power mode.

As a result, actual reduction of the alternating power to be supplied to the discharge lamp is delayed for the delay time TD in the second embodiment. Thus, the duty ratio can be varied while rated power is being supplied to the discharge lamp. Accordingly, concaves and convexes at the tips of the electrodes which are difficult to be fused after actual reduction of alternating power can be fused, and generation of flicker can be further prevented.

The change pattern of the duty ratio in the second embodiment is not limited to the change pattern shown in the first embodiment, but may be varied similarly to the modified examples 1 through 4 of the first embodiment, similarly to the first embodiment.

C. Third Embodiment

A third embodiment according to the invention is hereinafter described. In the first and second embodiments, the rated power mode is switched to the low power mode in a short time. According to the third embodiment, however, this switching is gradually carried out in a predetermined switching period.

Figure 15:
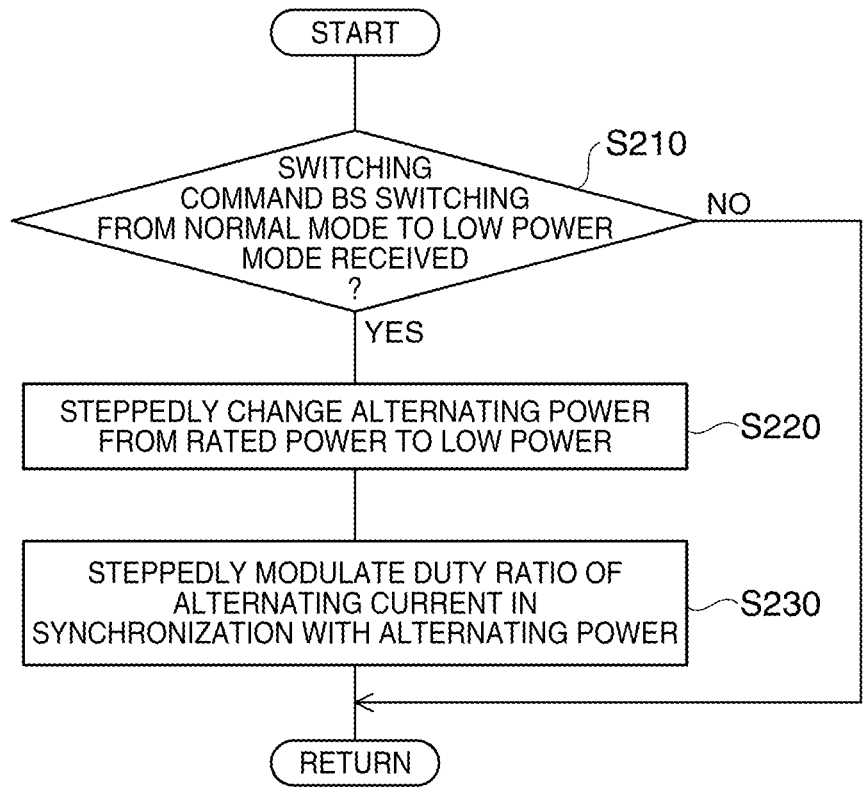
FIG. 15 is a flowchart showing a switching time control routine according to a third embodiment.

FIG. 15 is a flowchart showing a switching time control routine according to the third embodiment. This switching time control routine is repeatedly executed after the power source of the control circuit is turned on. Step S210 is similar to step S10 in the first embodiment. The CPU of the control circuit steppedly switches alternating power supplied to the discharge lamp 500 from rated power to low power when it is determined that the command for switching from the rated power mode to the low power mode has been received in step S210 (S220), and also steppedly modulates the duty ratio of the alternating current in synchronization with the alternating power (step S230). In the figure, step S230 is executed after step S220. In the practical situation, however, reduction of the alternating power and change of the duty ratio of the alternating current are performed synchronously.

Figure 16A:
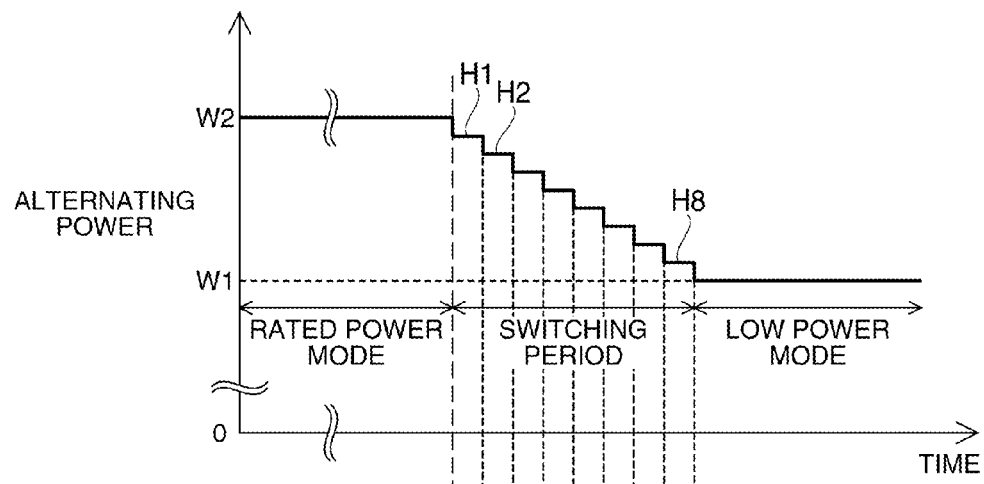
FIGS. 16A and 16B illustrate modulation of alternating current containing timing charts according to the third embodiment.
Figure 16B:
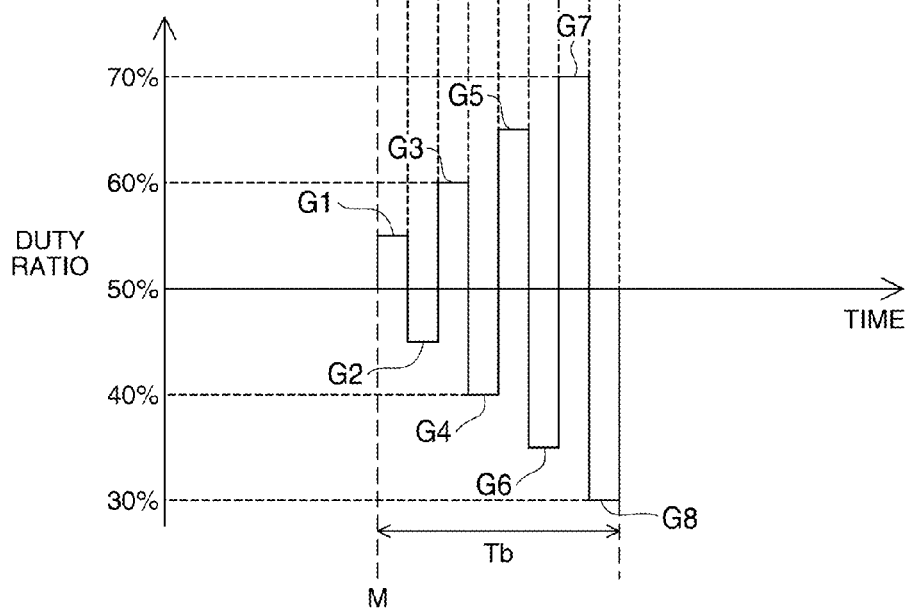

FIGS. 16A and 16B show modulation of alternating current containing timing charts according to the third embodiment. As illustrated in FIG. 16A, the rated power W2 (such as 200 W) is switched to the low power W1 (such as 170 W) in a predetermined switching period Tb at the time of reception of the command for switching from the rated power mode to the low power mode (time M) in response to press of the push button switch 300.

According to this embodiment, the switching period Tb is divided into eight division terms H1, H2, and up to H8. The alternating power is decreased 3.75 W (=W2−W1)/8) for each of the division terms H1 through H8 to reach the low power W1 after elapse of the switching period Tb. In this embodiment, each length of the division terms H1 through H8 is set at 1 second.

As shown in FIG. 16B, the duty ratio of the alternating current inputted to the discharge lamp 500 is steppedly modulated for the switching period Tb. The switching period Tb is divided into eight division terms G1 through G8 similarly to the alternating power (i.e., H1 and G1 have the same length). The duty ratio (reference duty ratio) is 55% in the division term G1, 45% in division term G2, 60% in the division term G3, and 40% in the division term G4, 65% in the division term G5, 35% in the division term G6, 70% in the division term G7, and 30% in the division term G8. That is, the duty ratio is changed to ratios larger than the reference duty ratio and ratios smaller than the reference duty ratio, and is varied such that the change increases and decreases 5% for each pair of steps with respect to the reference duty ratio on the larger side and the smaller side, respectively. The change for each step is not limited to 5% but may be other values, and the length and number of the division terms may be other values.

According to the third embodiment, therefore, the duty ratio can be steppedly varied in synchronization with the stepped change of the alternating power from the rated power to the low power. Since the reduction rate of the power and the change rate of the duty ratio are set in correspondence with each other, the control accuracy can be increased. Thus, generation of flicker during the power reduction can be further securely prevented.

According to the third embodiment, switching from the rated power mode to the low power mode is steppedly achieved in the switching period Tb. However, this switching may be achieved at a uniform change rate in the switching period Tb. That is, reduction of power from the rated power mode to the low power mode may be gradually achieved in a period equivalent to the predetermined period for modulation of the duty ratio. According to this structure, the power reduction rate does not completely correspond to the duty ratio change rate for each division term, but the duty ratio can be varied in a period synchronous with the switching period from the rated power mode to the low power mode. Thus, generation of flicker during power reduction can be sufficiently prevented.

While the change pattern of the duty ratio in the third embodiment is the pattern shown in FIG. 16B, the change patterns similar to those in the first embodiment and the modified examples 1 through 4 of the first embodiment may be employed. In this case, the duty ratio is steppedly varied in synchronization with the stepped reduction of the alternating power.

D. Fourth Embodiment

Figure 17:
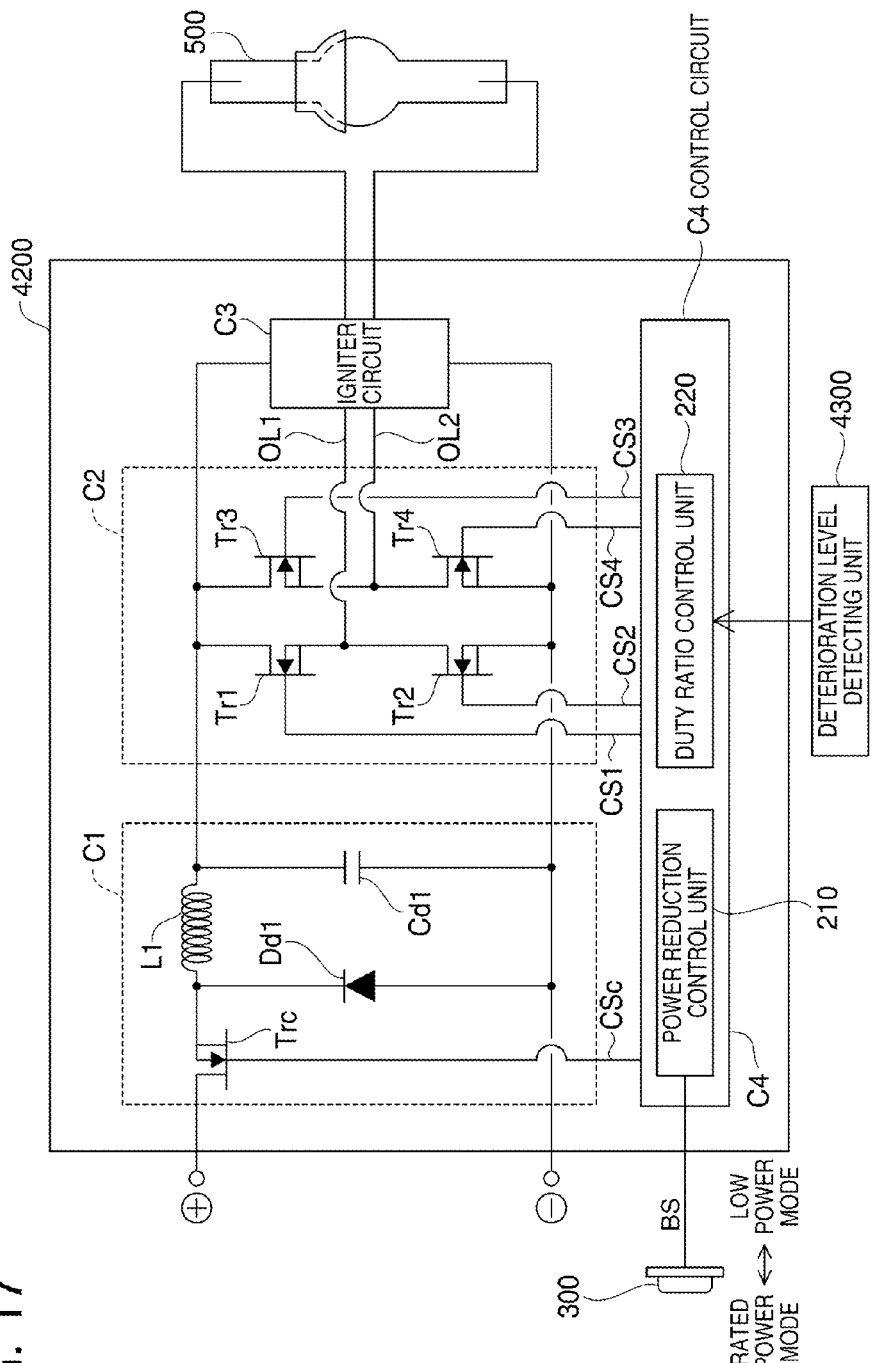
FIG. 17 illustrates a structure of a power supply unit and its surroundings included in a projector according to a fourth embodiment.

FIG. 17 illustrates a structure of a power supply unit 4200 and its surroundings provided on a projector according to a fourth embodiment. This projector is different from the projector in the first embodiment in that a deterioration level detecting unit 4300 for detecting deterioration level of the electrodes of the discharge lamp is provided. The deterioration level detecting unit 4300 times cumulative lighting time of the projector. That is, the deterioration level detecting unit 4300 detects the level of deterioration of the electrodes of the discharge lamp based on the cumulative lighting time of the projector. The deterioration level detecting unit 4300 may detect voltage between the electrodes of the discharge lamp to recognize deterioration level of the electrodes of the discharge lamp. This structure is based on the fact that the voltage between the electrodes kept substantially constant regardless of current to be supplied increases as the deterioration level rises. The deterioration level detecting unit may have any structure as long as it can detect level of deterioration of the electrodes of the discharge lamp.

The power supply unit 4200 is partially different from the power supply unit 200 in the first embodiment in that the process performed by the duty ratio control unit 220 is different. The power supply unit 4200 receives detection signal from the deterioration level detecting unit 4300 and varies change of the duty ratio for each step during duty ratio control according to the detection signal. When low deterioration is indicated by the detection signal from the deterioration level detecting unit 4300, the change for each step is decreased (such as 5% as in the first embodiment). When high deterioration is indicated by the detection signal from the deterioration level detecting unit 4300, the change for each step is increased (such as 7%). The change for each step is not limited to either large change or small change, but may be varied through a larger number of changes depending on the level of deterioration.

According to the structure of the fourth embodiment, therefore, the change for each step increases as the level of deterioration of the electrodes rises. Thus, generation of flicker at the time of switching to low power can be prevented for the entire life of the discharge lamp.

E. Other Modified Examples

Elements other than claimed in the independent claims contained in the constituent elements according to the respective embodiments and modified examples are only additional elements and can be eliminated as necessary. The invention is not limited to the embodiments and modified examples described herein, but may be practiced otherwise without departing from the scope and spirit of the invention. For example, the following modifications may be made.

Modification 1

According to the respective embodiments and modified examples, the power reduction control unit switches from the rated power as the first level power to the low power as the second level power. However, the first level power and the second level power are not limited to those powers but may be any powers as long as the second level power is smaller than the first level power.

Modification 2

According to the respective embodiments and modified examples, the power reduction control unit receives the switching command BS for switching from the rated power mode to the low power mode from the push button switch 300. However, the switching command BS is not limited to a command transmitted from the push button switch 300. For example, the power reduction control unit may receive the switching command BS for switching from the rated power mode to the low power mode from a control unit other than the power control unit included in the projector. Alternatively, the power control unit may determine the switching time for switching from the rated power mode to the low power mode based on the respective operation conditions to adopt the invention at the time of switching.

Modification 3

The structure, material and the like of the discharge lamp main body 510 in the respective embodiments are only examples, and other structures and materials can be used. For example, the two electrodes 532 and 542 are not required to face each other on the same axis but may project in the same direction. Generally, any structures containing two discharge electrodes can be employed. The lamp may be constituted by various types of lamp such as high-pressure mercury lamp and metal halide lamp. The structure of the light source unit is not limited to the structure shown in FIG. 2, but may be arbitrary structures including the discharge lamp. For example, the reflection mirrors 112 and 520 may be eliminated.

Modification 4

While the liquid crystal light valves 330R, 330G, and 330B are transmission type liquid crystal light valves according to the respective embodiments, they may be reflection type liquid crystal light valves. The spatial light modulation units for modulating light emitted from the discharge lamp into projection light for projecting images are liquid crystal light valves in the respective embodiments, but the spatial light modulation units may be arbitrary spatial light modulation devices. For example, micromirror type light modulation devices such as digital micromirror devices (DMD: trademark of TI Inc.) can be used. The total number of the spatial light modulation units is not limited to three but may be arbitrary number. For example, one, two, four or more units may be included.

Modification 5

A projector can be divided into two types. One is front projector which projects images in the projection surface viewing direction, and the other is rear projector which projects images in the direction opposite to the projection surface viewing direction. The structure of the projector shown in FIG. 1 is applicable to both types.

Modification 6

The light source devices 100, 100A, and 100B in the respective embodiments may be included in any devices other than the projector. For example, the light source devices 100, 100A, and 100B can be incorporated in a head light of a vehicle or an illumination device.

Modification 7

The structure of the power supply unit 200 in the respective embodiments is not limited to the structure shown in FIG. 3, but may be arbitrary structures as long as they can output alternating power as described herein. For example, the down chopper circuit C1 may be eliminated. In addition, other light emission starting device may be used in place of the igniter circuit C3. The circuit for controlling the waveform of the alternating power is not limited to the inverter bridge circuit C2 but may be other various types of circuit.

The structure of the discharge lamp drive device may be various types of structures as long as they include the power supply unit 200. For example, such a structure containing the power supply unit 200 and a power source can be employed. Alternatively, the power source may be removed from the drive device. In this case, an external power source is used.

Modification 8

A part of the structure provided as hardware in the respective embodiments may be replaced with a structure provided as software. Also, a part or all of the structure provided as software may be replaced with a structure provided as hardware.

When a part or all of the functions of the invention are provided by software, the software (computer program) can be provided in the form stored in a recording medium readable by a computer. A "recording medium readable by a computer" according to the invention is not limited to portable recording medium such as flexible disk and CD-ROM, but includes internal memory unit within a computer such as various types of RAM and ROM and external memory unit fixed to a computer such as hard disk.

The entire disclosure of Japanese Patent Application No. 2009-068612, filed Mar. 19, 2009 is expressly incorporated by reference herein.

What is claimed is:

1. A discharge lamp drive device for driving a discharge lamp including a first electrode and a second electrode, comprising:
    a power supply unit that supplies alternating power to the discharge lamp by inputting alternating current between the first electrode and the second electrode; and
    a deterioration level detecting unit that detects a deterioration level of the electrodes,
    the power supply unit including
        a power reduction control unit that reduces the alternating power from a first level to a second level lower than the first level, and
        a duty ratio control unit that steppedly varies a duty ratio of the alternating current in a predetermined period at the time of reduction of the alternating power, the duty ratio control unit determining the duty ratio change between adjoining division terms based on the deterioration level detected by the deterioration level detecting unit.

2. The discharge lamp drive device according to claim 1, further comprising:
    a switching command receiving unit that receives a switching command for switching from a rated power mode for driving the discharge lamp by rated power as the first level to a low power mode for driving the discharge lamp by low power as the second level from the outside of the discharge lamp drive device,
    the power reduction control unit executing the reduction when the switching command receiving unit receives the switching command, and
    the duty ratio control unit determining the predetermined period as a period starting when the switching command receiving unit receives the switching command.

3. The discharge lamp drive device according to claim 1, further comprising:
    a switching command receiving unit that receives a switching command for switching from a rated power mode for driving the discharge lamp by rated power as the first level to a low power mode for driving the discharge lamp by low power as the second level from the outside of the discharge lamp drive device,
    the power reduction control unit executing the reduction after elapse of a predetermined delay time from the time when the switching command receiving unit receives the switching command, and
    the duty ratio control unit determining the predetermined period as a period starting when the switching command receiving unit receives the switching command.

4. The discharge lamp drive device according to claim 2, wherein the duty ratio control unit determines the end of the predetermined period as the time when the low power mode is finished.

5. The discharge lamp drive device according to claim 1, wherein the power reduction control unit gradually executes the reduction from the first level to the second level in a period equivalent to the predetermined period.

6. The discharge lamp drive device according to claim 5, wherein:
    the power reduction control unit steppedly varies the reduction from the first level to the second level; and
    the duty ratio control unit synchronizes the stepped change of the duty ratio with the stepped change of the alternating power by the power reduction control unit.

7. The discharge lamp drive device according to claim 1, wherein the duty ratio control unit varies the duty ratio in accordance with one cycle pattern or plural cycle patterns, and determines the one cycle pattern or the plural cycle patterns such that one cycle contains plural division terms and that duty ratio change between adjoining division terms becomes constant.

8. A light source device comprising:
    a discharge lamp;
    the discharge lamp drive device according to claim 1;
    a main reflection minor disposed on the first electrode side of the discharge lamp to reflect light emitted from the discharge lamp in a predetermined direction; and
    a sub reflection mirror disposed on the second electrode side of the discharge lamp to reflect light emitted from the discharge lamp toward the main reflection minor.

9. A projector comprising:
    a discharge lamp;
    the discharge lamp drive device according to claim 1;
    a spatial light modulation unit that modulates light emitted from the discharge lamp into projection light for projecting an image; and
    a projection system that projects the projection light.

10. A projector comprising:
    a discharge lamp;
    the discharge lamp drive device according to claim 2;
    a spatial light modulation unit that modulates light emitted from the discharge lamp into projection light for projecting an image; and
    a projection system that projects the projection light.

11. A projector comprising:
a discharge lamp;
the discharge lamp drive device according to claim 3;
a spatial light modulation unit that modulates light emitted from the discharge lamp into projection light for projecting an image; and
a projection system that projects the projection light.

12. A projector comprising:
a discharge lamp;
the discharge lamp drive device according to claim 4;
a spatial light modulation unit that modulates light emitted from the discharge lamp into projection light for projecting an image; and
a projection system that projects the projection light.

13. A projector comprising:
a discharge lamp;
the discharge lamp drive device according to claim 5;
a spatial light modulation unit that modulates light emitted from the discharge lamp into projection light for projecting an image; and
a projection system that projects the projection light.

14. A projector comprising:
a discharge lamp;
the discharge lamp drive device according to claim 6;
a spatial light modulation unit that modulates light emitted from the discharge lamp into projection light for projecting an image; and
a projection system that projects the projection light.

15. A projector comprising:
a discharge lamp;
the discharge lamp drive device according to claim 7;
a spatial light modulation unit that modulates light emitted from the discharge lamp into projection light for projecting an image; and
a projection system that projects the projection light.

16. A discharge lamp drive method for driving a discharge lamp including a first electrode and a second electrode, the method comprising:
supplying alternating power to the discharge lamp by inputting alternating current between the first electrode and the second electrode;
detecting a deterioration level of the electrodes; and
determining a duty ratio change between adjoining division terms based on the deterioration level detected,
wherein supplying the alternating power includes
reducing the alternating power from a first level to a second level lower than the first level, and
steppedly varying the duty ratio of the alternating current in a predetermined period at the time of reduction of the alternating power.

* * * * *